United States Patent
Colvin, Sr.

[11] Patent Number: 5,841,872
[45] Date of Patent: Nov. 24, 1998

[54] ENCRYPTION ENHANCEMENT SYSTEM

[75] Inventor: Bryan Colvin, Sr., San Jose, Calif.

[73] Assignee: Allsoft Distributing Incorporated, San Jose, Calif.

[21] Appl. No.: 675,285

[22] Filed: Jul. 1, 1996

[51] Int. Cl.[6] .................................................. H04K 1/00
[52] U.S. Cl. ............................ 380/28; 380/29; 380/46; 364/717
[58] Field of Search ................................ 380/28, 29, 46; 364/717

[56]                References Cited

U.S. PATENT DOCUMENTS

| | | | |
|---|---|---|---|
| 4,720,859 | 1/1988 | Aaro et al. | 380/46 |
| 4,776,011 | 10/1988 | Busby | 380/28 |
| 5,003,597 | 3/1991 | Merkle | 380/28 |
| 5,241,599 | 8/1993 | Bellovin et al. | 380/28 |
| 5,263,085 | 11/1993 | Shamir | 380/23 |
| 5,297,206 | 3/1994 | Orton | 380/28 |
| 5,301,235 | 4/1994 | Shimada | 380/28 |
| 5,452,348 | 9/1995 | Adams et al. | 379/202 |
| 5,452,358 | 9/1995 | Normile et al. | 380/46 |
| 5,511,123 | 4/1996 | Adams | 380/29 |
| 5,519,736 | 5/1996 | Ishida | 364/717 |
| 5,533,127 | 7/1996 | Luther | 380/28 |
| 5,539,827 | 7/1996 | Liu | 380/28 |
| 5,570,307 | 10/1996 | Tkahashi | 380/46 |
| 5,574,673 | 11/1996 | Lowy | 364/717 |
| 5,600,724 | 2/1997 | Masnikosa | 380/28 |
| 5,602,845 | 2/1997 | Wahl | 364/717 |
| 5,602,917 | 2/1997 | Mueller | 380/46 |
| 5,608,802 | 3/1997 | Alvarez | 380/28 |
| 5,613,005 | 3/1997 | Murakami et al. | 380/28 |
| 5,619,576 | 4/1997 | Shaw | 380/28 |
| 5,623,545 | 4/1997 | Childs et al. | 380/28 |
| 5,627,894 | 5/1997 | Albert et al. | 380/46 |

OTHER PUBLICATIONS

Schneier, *Applied Cryptography*, 2nd Edition, 1996, p.419.

*Primary Examiner*—David C. Cain
*Attorney, Agent, or Firm*—McCutchen, Doyle, Brown & Enersen

[57]  ABSTRACT

A system for enhancing an existing data encryption system by preprocessing or postprocessing the data stream as it enters or leaves the encryption system. This external processing makes the encrypted data stream much more difficult to analyze by introducing data content dependencies into the modified, encrypted data stream.

9 Claims, 1 Drawing Sheet

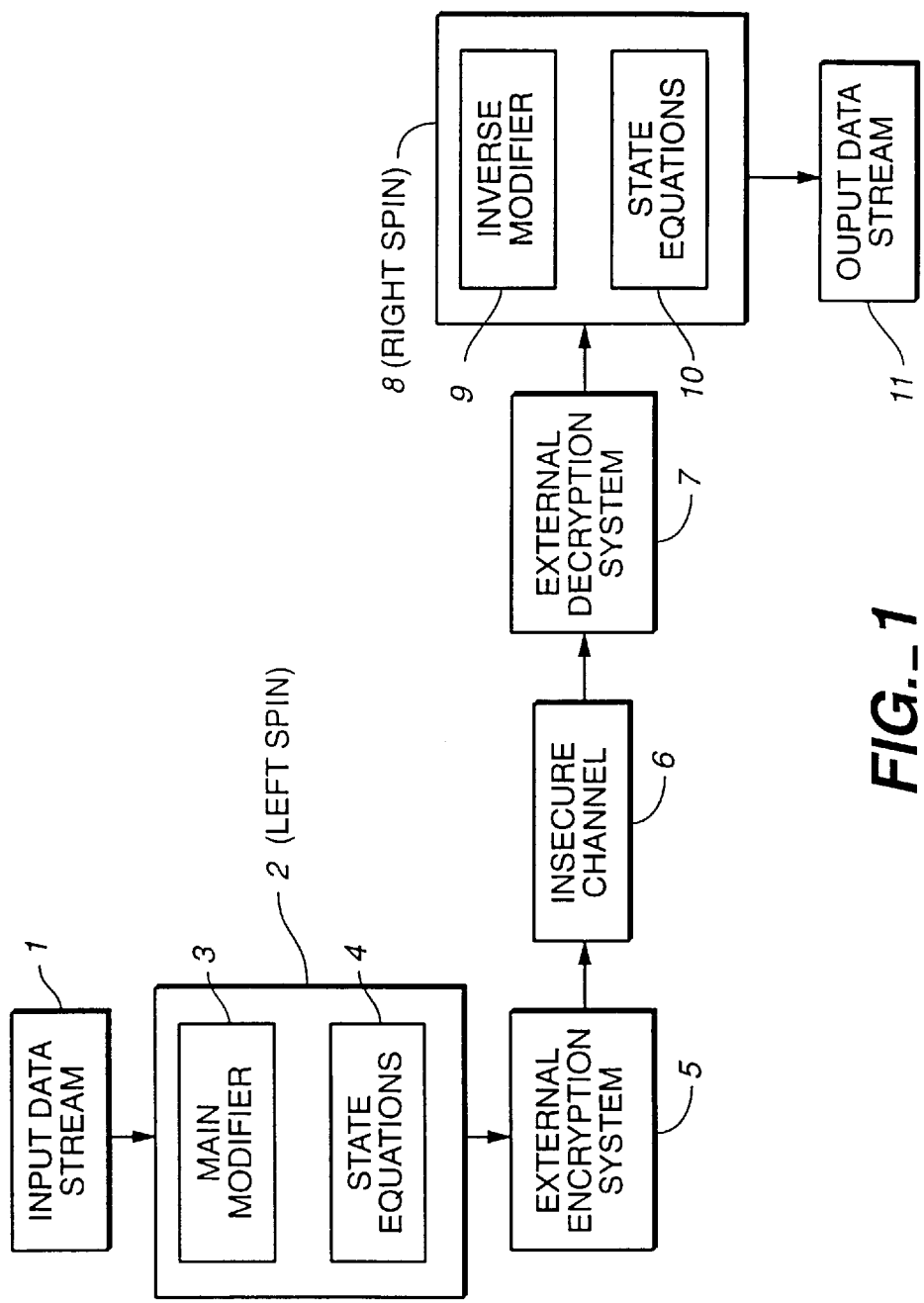
FIG._1

ENCRYPTION ENHANCEMENT SYSTEM

FIELD OF THE INVENTION

The present invention relates to encryption and, more particularly, to enhancement of data the security provided by encryption systems.

BACKGROUND OF THE INVENTION

Conventional encryption systems commonly use a pseudo-random number generator to encrypt a stream of data. For example, many conventional encryption systems involve XOR'ing (bitwise) a stream of (pseudo) random numbers with the input data stream. So long as the random number stream is not known, the resulting output data also looks like a stream of random numbers. The principal way to crack the code is to learn how to recreate the random number stream and then to XOR the encrypted data stream with this random number stream, thereby regenerating the original data.

One problem with many conventional encryption systems based on random number generators is that it is possible to gain an understanding of the meaning of a message without fully decrypting the message. The reason is that, if two documents are essentially identical except for a single bit or byte, the resulting encrypted messages generally will be nearly identical as well. The same is true for decryption; if a single bit or byte is different, the decrypted messages will look nearly the same.

A common attack on the security of such encryption systems also exists. With the aid of computers, analysts compare how small variations in input data affect the encrypted data. By making a sufficient number of comparisons, analysts often can determine the secret random number sequence.

Many less sophisticated cryptography systems do not use a random number generator as described above. Instead, they use a rotating key of a fixed length to encrypt the data stream. This type of encryption system is easily cracked using differential analysis techniques.

Accordingly, there is a need to enhance many conventional encryption systems.

SUMMARY OF THE INVENTION

The present invention provides an encryption enhancement system utilizing a process hereafter referred to as "data spinning," which involves introducing data into the random number generation process such that the output is a function of the introduced data. The present invention makes it more difficult break the security of encryption systems, because a single mistake in the decryption processes causes the remaining data to become totally scrambled. Nevertheless, this invention permits decryption using a straightforward, albeit nonintuitive, reversal process.

Many additional advantages of the present invention will become apparent to those skilled in the art based on the present disclosure.

BRIEF DESCRIPTION OF THE DRAWINGS

A complete understanding of the present invention may be gained by considering the following detailed description in conjunction with the accompanying drawing, in which:

FIG. 1 shows an encryption enhancement system according to the present invention.

DETAILED DESCRIPTION OF PREFERRED EMBODIMENT(s)

Embodiments of the present invention utilize the concept of data spinning. Certain embodiments can be used to enhance any encryption system making the enhanced system much more difficult to analyze and decipher. Other embodiments are used as stand alone encryption systems.

The technique of introducing input data into a pseudo-random number generating process has been used in the field of signature analysis. Signature analysis involves the creation of a random number based on the series of patterns (i.e., a signature data stream) that is introduced into a pseudo-random number generator. Signature analysis makes it possible to distinguish one stream of data from another stream in a statistical process known as error analysis. In error analysis, only the final state of the variables is important. This technique has not generally been used in cryptography, however, because of the lack of knowledge it takes to extract the original data from the encrypted data.

FIG. 1 shows one embodiment of an encryption system according to the present invention. In FIG. 1, the original input data stream 1 is encrypted, transmitted across an insecure channel 6, and decrypted by external decryption system 7, ultimately ending up as output data stream 11, which should be exactly the same as the original data stream.

Encryption/decryption enhancement system 2 (also referred to as "LEFT SPIN 2") uses "data spinning" to enhance the encryption process. Main modifier 3 uses a reversible function (such as XOR to XOR, subtract to add, rotate left to rotate right, or other such reversible operations) to modify data. In certain embodiments, incoming data is modified by state equations modifier 4 with a function of state variables. State equations modifier 4 includes a series of state equations that include the input data. This makes the next state of the state variables a function of the input data stream. The output of main modifier 3 is fed into external encryption system 5, which may be any encryption system currently available on the market. The data leaving system 5 is broadcast on an insecure channel, such as the Internet or other public network. This data stream is now much more difficult to decipher.

In order to unscramble the data, external decryption system 7 is first used; then encryption/decryption enhancement system 8 (also referred to as "RIGHT SPIN 8") operates on the resulting data. Because data spinning is a non-linear operation, order of operations is important. If external encryption system 5 were to preceed the left spin 2, then right spin 8 must preceed external decryption system 7. In the preferred embodiment, external decryption system 7 removes the last applied operation performed by external encryption system 5. After this operation, the data is "unspun" or "spun right" by state equations 10 and inverse modifier 9. Inverse modifier 9 applies the inverse of the process that was performed by main modifier 3. State equations 10 is identical to state equations 4 except for the fact that the result of the reverse modifier which resembles the original data is used instead of the data stream originating from the external decryption system 7. In this way, the sequence of the state variables are matched producing the same result. In FIG. 1, left spin 2 and right spin 8 can be exchanged.

DATA SPINNING

Data spinning is defined as the process by which the actual data is introduced into a random sequence generator. The reverse process is different from the forward process. Each process is labeled RIGHT SPIN or LEFT SPIN. Either process may be used to encrypt so long as the opposite process is used to decrypt. Below is a generalized system of equations that can be used to spin data:

RIGHT SPIN:
Y=Din MMOD Fm(X0,X1, . . . Xn)
X0={X0} MOD Fs0(Din,X0,X1, . . . Xn)
X1={X1} MOD Fs1(Din,X0,X1, . . . Xn)
Xn={Xn} MOD Fsn(Din,X0,X1, . . . Xn)

Where "Y" is defined as the encrypted output data stream. This output may be used directly or may be the input to another encryption engine such as PGP. Any data size may be used. Most common is 8-bit or byte format.

"Din" is defined as the input data stream.

"MMOD" (or main modifier) is a reversible combination operator. The most common examples are the bit-wise XOR operator and the ADD operator. Virtually every computer has these two operators. The XOR operator is fully reversible. The reverse direction of "ADD" is "SUB" or subtract.

MOD is any operator including lossey operations such as AND, OR.

"Fm(X0,X1, . . . Xn)" is a Boolean bitwise expression consisting of one or more state variables.

"Fsn(D,X0,X1, . . . Xn)" is the $n^{th}$ Boolean bitwise expression consisting of one or more state variables plus an optional input data equation.

LEFT SPIN:
Y=Din IMOD Fm(X0,X1, . . . Xn)
X0=X0MOD Fs0(Y,X0,X1, . . . Xn)
X1=X1MOD Fs1(Y,X0,X1, . . . Xn)
Xn=Xn MOD Fsn(Y,X0,X1, . . . Xn)

"IMOD" (or inverse modifier is the inverse operation of"MMOD" defined in the RIGHT SPIN main modifier; otherwise, this equation is identical in every way. The inverse operation only occurs during the main modifier. The bitwise XOR operator is fully reversible whereby the same function may be used for both "MOD" and "IMOD". In the event an ADD, or ROTATE is used, the inverse operation is used during the LEFT SPIN.

Each of the state variables in the LEFT SPIN is identical to the state variables in the RIGHT SPIN. The only difference is the substitution of "Din" with "Y" in each of the state variables. Note that the MOD operators are not reversed during the calculation phase of the state variables. It is possible but ill-advised to use lossey operators in place of the basic MOD operators (AND, OR, etc.). This is not recommended because of the possibility that the state variables which constitute a random sequence generator may converge into a constant stream. The function on the right side of the "MOD" operator may be lossey without harming the pseudo-random generation process.

The state variables constitute a random number generator with a seed value defined as the initial conditions of the state variables. A good test to see if the sequence is random is to force a continuous series of zeros into the data stream. The resulting sequence should be very close to white noise. The more operators that are added, the better the whiteness becomes. Adding real data only helps to further randomize the state variables.

Note that in the "LEFT SPIN" direction, the output of the main modifier is used instead of the input data as was used the "RIGHT SPIN" direction.

It is also possible to create a series of state equations that reference other state variables, as in the following example:
RIGHT SPIN:
X0=X2 MOD Fs0(Din,X0,X1,X2)
X1=X3 MOD Fs1(Din, X0,X1,X2)
X2=X1 MOD Fs2(Din,X0,X1,X2)

The analogous LEFT SPIN model could use "Y" in place of Din. Other potential combinations include but are not limited to using both Din and Y in the state equations 4, 10.

Each state equation, when going from right spin to left spin, would replace Din with Y and vice versa. Below is an example employing this teaching:
RIGHT SPIN:
X0=X0 MOD Fs0(Din, X0,X1,X2)
X1=X1 MOD Fs1(Y, X0,X1,X2)
X2=X2 MOD Fs2(Din, X0,X1,X2)
LEFT SPIN:
X0=X0 MOD Fs0(Y,X0,X1,X2)
X1=X1 MOD Fs1(Din, X0,X1,X2)
X2=X2 MOD Fs2(Y,X0,X1,X2)

PROGRAM EXAMPLE

This program example uses 8 data spinners operating on 8-bit data. The right side of the MOD operator (in this example XOR or ADD is used) uses a variety of bizarre Boolean expressions. This demonstrates the variety and flexibility of data spinning. Both the transmitting and receiving systems must be exactly related or chaos will result. The variety of state equations offers yet another level of protection. This program shows data spinning as a stand alone encryption system. Below is a typical example:

```
#include <stdio.h>
typedef unsigned char byte;
// complex data spinning encryption class written in C++:
class DataSpin
{
    public:
        DataSpin(byte s = 113, byte t = 121, byte u = 73 , byte v = 91 ,
                byte w = 201, byte x = 7 , byte y = 111, byte z = 101 );
        byte SPIN_RIGHT(byte);
        byte SPIN_LEFT(byte);
    private:
        byte S,T,U,V,W,X,Y,Z;
};
DataSpin::DataSpin(byte s, byte t, byte u, byte v,
                   byte w, byte x, byte y, byte z )
{
    S=s; T=t; U=u; V=v; W=w; X=x; Y=y; Z=z;
}
byte DataSpin::SPIN_RIGHT(byte DATA_IN)
{
    byte DATA_OUT;
    DATA_OUT = DATA_IN + ((T + U) ^ (Y + V) ^ (W + S));
        // forward MOD == ADD
    S += DATA_IN + (Z << (DATA_IN & 3 ));         // State Variables
    T ^= DATA_IN + X;
    U += Y ^ ((W + X) << (Z & 3));
    V ^= (Z + X) << 1;
    W += Z ^ Y;
    X ^= Z <<1;
    Y += Z;
    Z ^= DATA_IN;
    return DATA_OUT;
}
byte DataSpin::SPIN_LEFT(byte DATA_IN)
{
    byte DATA_OUT;
    DATA_OUT = DATA_IN - ((T + U) ^ (Y + V) ^ (W + S));
        // inverse *MOD == SUB
    S += DATA_OUT + (Z << (DATA_OUT & 3 ));        // State Variables
    T ^= DATA_OUT + X;
    U += Y ^ ((W + X) << (Z & 3));
    V ^= (Z + X) << 1;
    W += Z ^ Y;
    X ^= Z <<1;
    Y += Z;
    Z ^= DATA_OUT;
    return DATA_OUT;
}
```

-continued

```
void main( )
{
    static DataSpin A,B,C;   // initialize to default settings
    char *W = "This is a test to see if this silly thing works
or not!      ";
    static char X[60],Z[60];
    int i;
    // encrypt W into X . . .
    for (i=0;i<60;i++) X[i] = A.SPIN_RIGHT(W[i]);
    // decrypt X into Z . . .    {W =? Z }
    for (i=0;i<60;i++) Z[i] = B.SPIN_LEFT(X[i]);
    X[59]=0; // terminate the string so printf will stop!
    printf("\nBelow is the encrypted text:\n%s\n",X);
    printf("\nBelow should be readable:\n%s\n",Z);
    // create a 1-bit displacement and try again:
    X[5] ^= 1;
    for (i=0;i<60;i++) Z[i] = C.SPIN_LEFT(X[i]);
    X[59]=0; // terminate the string so printf will stop!
    printf("\nOne bit displacement on the fifth character
below:\n%s\n",Z);
}
```

PROGRAM OUTPUT

Below is the encrypted text:
å°Ñ, u☐M+*_(+%++¤;Å+}+>ñ Ç°OŸё–¼Å¦ ¦4☐_! ` ¦
¦OA_}+éf@ Æ<_@ä
Below should be readable:
This is a test to see if this silly thing works or not!
One bit displacement on the fifth character below:
This j+Æn–%
x☐___öè+a¦☐ái–__]- ƒ§ìSoö_.k☐Å_Ñ--+_-_E& ¡1
☐t__¬§d+☐     §<<☐    §£☐    §

PROGRAM COMMENTARY

With a single bit error in the 5$^{th}$ position, the encrypted data stream is totally garbled. By contrast, conventional encryption systems "heal" themselves after such an event. In other words, only the "t" in "test" would have been affected. There is no limit on how many state variables there could be. In this example there are only 8. Eight variables is equivalent to a 64-bit private key in other encryption systems known in the art.

The method by which the random numbers are generated by virtue of the state variables family of equations may also be considered as part of the difficulty of analyzing the data packets.

The state variables used in this program example are identical for LEFT_SPIN and RIGHT_SPIN except for the exchange of input and output data. It is important to note that reverse operators are not used in the state variables, but only in the "main modifier".

Another possibility is to reverse the order of spinning: SPIN_LEFT first to encrypt, then SPIN_RIGHT to decrypt. The resulting encrypted stream is completely different when "spun" in this manner.

The present invention encompasses all subject-matter within the scope of the following claims. In this regard, it will be appreciated by those skilled in the art that additional embodiments of the present invention beyond those explicitly discussed above may be made without departing from the teachings of the present invention. Such embodiments are intended to be within the scope of the claims.

For example, it will be apparent to those skilled in the art based on the present disclosure that a decryption process can be used to encrypt data, and vice versa. In other words, decryption can be used as a form of encryption. It will further be apparent based on the present disclosure that the present invention may be implemented in hardware or software.

It will further be apparent to those skilled in the art based on the present disclosure that the present invention may be used to encrypt and decrypt data sent over the Internet or any other insecure channel for purposes of private communication, digital commerce, banking, or any other application.

I claim:

1. A data encryption system, comprising:
    an input for receiving a stream of input data that is to be encrypted;
    a data modifier that uses a pseudo-random number stream to modify the input data to produce a stream of modified data, the data modifier having a random number generator that uses the value of the input data to generate the pseudo-random sequence of numbers; and
    an output for outputting the stream of modified data.

2. The data encryption system of claim 1, further comprising an external encryption system, wherein the external encryption system receives the modified data from the output and further encrypts the modified data.

3. The data encryption system of claim 1, further comprising an external encryption system wherein the external encryption system modifies the received stream of input data before the received stream of input data is provided to the data modifier.

4. A data decryption system, comprising:
    an input for receiving a stream of encrypted input data; and
    a data modifier that uses a pseudo-random number stream to modify the encrypted data to produce a stream of output data, the data modifier having a random number generator that uses the value of the encrypted input data to generate the pseudo-random sequence of numbers.

5. The data decryption system of claim 4, further comprising an external decryption system, wherein the external decryption system further modifies the output data to produce decrypted output data.

6. The data decryption system of claim 4, further comprising an external decryption system, wherein the external decryption system modifies the received stream of encrypted data before the received stream of encrypted data is provided to the data modifier.

7. A random sequence generator, comprising:
    an input for receiving a stream of input data; and
    a plurality of state variables, the state variables being modified by a function of one or more of the state variables and the stream of input data;
    wherein the input data is modified by one or more of the state variables to produce a stream of scrambled data.

8. A data unscrambling system, comprising:
    an input for receiving a stream of scrambled data; and
    a descrambler having one or more state variables for modifying the scrambled data;
    wherein the state variables are modified by a function of one or more state variables and the unscrambled data stream.

9. An encryption system, comprising:
    a data spinner; and
    an external encryptor, wherein the external encryptor operates on data output from the data spinner.

* * * * *